2,888,790

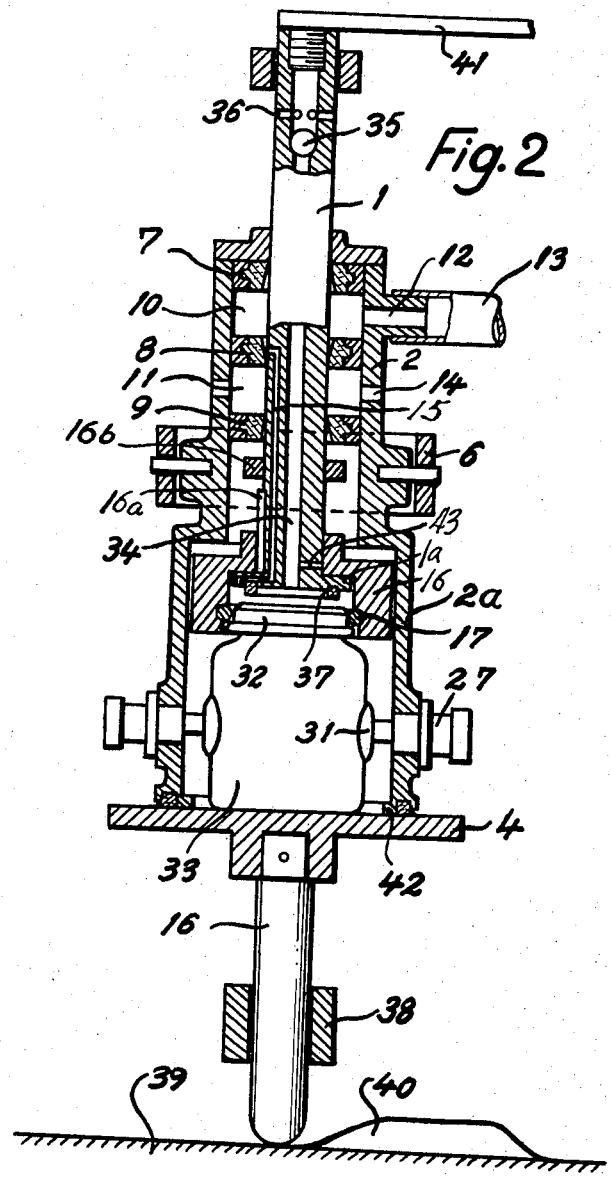

APPARATUS FOR APPLYING A BAYONET COVER OR A THREADED COVER TO A CONTAINER IN THE INTERIOR OF WHICH A VACUUM SHALL BE PRESENT WHEN THE COVER HAS BEEN APPLIED THERETO

Peter Ole Rasmussen, Ebberup, Funen, Denmark, assignor to Sønderbys Fabriker A/S (E. F. Esmann A/S), Copenhagen, Denmark, a body corporate of Denmark Application August 26, 1957, Serial No. 680,285

Claims priority, application Denmark September 10, 1956

9 Claims. (Cl. 53—86)

The invention relates to an apparatus for applying covers, lids or similar closures to containers, while the containers are subject simultaneously to gas-evacuating means.

The primary object of the invention is to provide an apparatus for applying a bayonet cover, or a threaded cover to a container under vacuum in a simplified efficient manner.

A further object of the invention is to provide an apparatus as described, utilizing the available suction-means, as means for holding the covers intermittently is position above the orifices of the containers, while the containers are evacuated, prior to closing them. Another object of the invention is to provide an apparatus as described with suction-means, to position the cover over the orifice of the container in a vacuum, and to release the cover subsequent to the closing of the container, by restoring atmospheric pressure to its outside.

Another object of the invention is to provide gripping means to the container during the covering period, by utilizing the suction means also as gripping means and means to relase the container from the grip by restoring atmospheric pressure.

Another object of the invention is to provide apparatus-means synchronizing the several stages of container-evacuation, cover-holding, container holding, cover release and container release by suction and by return to atmospheric pressure.

Still another object of the invention is to provide an apparatus described, having means to align each cover with its respective container preliminary to closing it, by arranging the container, the gripping-means and the closure positioning means into a cooperative assembly.

Still another object of the invention is to provide an apparatus for applying a threaded closure to a container having a correspondingly threaded orifice.

Yet another object of the invention is to provide apparatus of the type described operable manually or by foot.

Another object of the invention is to provide an apparatus of the type described, suitable for connection to conventional automatic devices for continuous handling of a succession of covers and containers under vacuum.

The nature of the invention and its various other objects and advantages will be better understood from the following description taken in conjunction with the accompanying claims and drawings.

In the drawings:

Fig. 2 is a vertical cross-sectional view of another exemplary embodiment of the invention.

Figure 1:
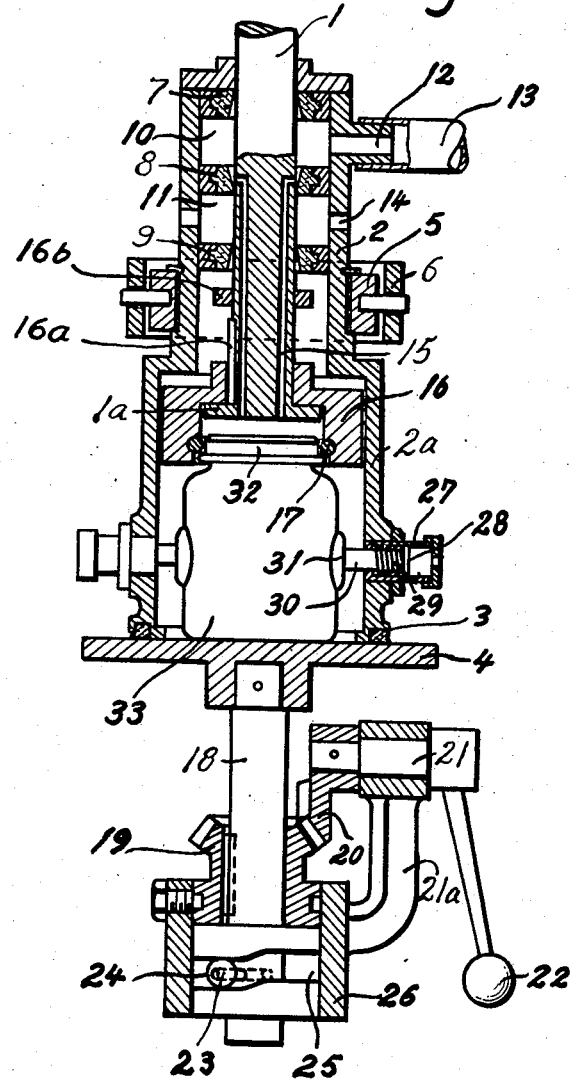
Fig. 1 is a vertical cross-sectional view of an exemplary embodiment of the apparatus of the invention.

In Fig. 1 an apparatus is shown, comprising a stationary guide rod, having a stem 1 with a chuck 1a at its bottom, a vacuum bell-housing, having an upper neck portion 2, and a lower bell 2a. The bell-housing is mounted coaxially with the guide rod and having at its lower end a packing 3 through which the bell 2 may rest against a support 4. The vacuum bell-housing is rotatably mounted in a ring 5 which may be displaced upward and downward by fork 6, part of which only is shown. The neck-portion of the bell is provided with three packings 7, 8, 9 to create there two compartments; a vacuum-compartment 10, connected through a pipe branch 12 to a vacuum pipe 13, and an atmospheric-compartment 11, connected to the atmosphere through apertures 14. The guide rod is provided with a conduit-boring 15, ending with one orifice in the chuck of the guide rod and with its other orifice on the outer side of the stem, so that, dependent on the position of the neck of the bell-housing relatively to the stem, this conduit connects either the vacuum compartment or the atmospheric compartment with the bell. This conduit hereinafter will be referred to as the bell conduit.

At the lower end of the guide rod 1 a cover retainer 16 is axially slidable relatively to it, but cannot be rotated relatively thereto, because of a key 16a. A ring 16b surrounds stem 1 and functions as a stop to the neck-portion of the retainer 16. The retainer 16 is cup-shaped, and in its inner side-wall a resilient ring 17 is provided, which may either be in the form of a helical spring-ring, or of an elastically resilient material.

The ring, if made of a resilient material, is provided with air-channels, to permit evacuation of the bell. The support 4 is mounted on a vertical shaft 18 which carries a bevel wheel 19, meshing with a bevel sector 20 mounted on a horizontal shaft 21 provided with an operating handle 22. The lower end of the shaft 18 is provided with a pin 23 carrying a roller 24 sliding in a groove 25 in the interior of a stationary member 26 in which the bevel wheel 19 is mounted. The bevel-shaft bearing support 21a is fixed to the frame of the apparatus.

In the wall of the bell two cylinders 27 are mounted, in which pistons 28 are disposed so as to be forced outwardly by means of a spring 29, each piston 28 having a piston rod 30, on the free end of which a gripper 31 is provided, made preferably of a resilient material, for instance, rubber. The spring action is caluclated to withdraw the grippers from the container when the vacuum is released.

When the bell 2 has been raised to its upper position a cover 32 may be placed in the cover retainer 16, and, furthermore, a container 33 may be placed on the support 4. Then the bell 2 is lowered around the container until the packing 3 comes to an air-tight rest against the support 4, in which position the bell conduit will communicate with the vacuum compartment 10, to provide vacuum in the container within the bell. This vacuum will draw the pistons 28 and the grippers 31 radially into the vacuum bell until they press against the container, thereby centering it, aligning it with the cover above and taking a firm hold thereon. By operating the handle 22 the support 4 may be rotated, thereby carrying along the vacuum bell and the container, so as to rotate the latter relative to the cover 32. The threaded cover is thus screwed on the orifice of the container and by further rotating the handle 22 the roller 24 will pass the point of the groove 25, where the latter has a slight pitch, so that the shaft 18 is raised. Simultaneously, the bell will be raised so that packing 8 will leave the bell-orifice conduit 15, which will align itself with the atmospheric compartment. Thus air enters below the bell. The bell is disengaged from the support and may be freely raised, the pistons 28 are forced backward and by means of springs 29 and grippers 31 their hold on the container 33 will be released. While the mechanism of Fig. 1 has been described above for use with a threaded cover to be screwed on a threaded container neck, the apparatus is similarly useful for clamping or pressing a bayonet type cover over the neck of a container, by conventional methods. In such a case the relative rotation between the container and cover are omitted and compressing means are substituted for it. The applying of the closure may be accomplished by vertical reciprocation of the guide rod, after the cover has been positioned on the container by the cover retainer against the support; or by the cover retainer itself, pushed down by the bell against the support; or by the support pushing upward against a stationary guide rod; or against cover retainer and bell; and in the alternative, the guide rod, and/or the bell with the cover retainer on one side and the support on the other side, simultaneously may be moved toward each other. If in addition to the vertical reciprocation the rotary movements between the cover and container are to be accomplished this can be caused by rotating either the guide rod, equipped with cover, the holding means, or by rotating the cover retainer, either against a non-rotating support, or against a support rotating in the opposite direction. The bell-housing, however, shares the movements of the support, since it forms therewith a vacuum chamber under frictional air-tight contact.

While only preferred embodiments are being described here in details with reference to Figs. 1 and 2, it is to be understood that each of the above outlined alternatives in combination with the suction and vacuum release means of the present invention are considered to be an integral part of the invention and are intended to be claimed.

It will become obvious to those skilled in the art that the apparatus of the invention is also suitable for incorporation into an automatic continuously operating turntable-type and/or moving belt-type machinery, having the conventional stages of container-feeding to support 4, cover-feeding to cover-retainer 17, of enclosing cover-retainer and container to be closed under bell 2a, and of evacuating the bell by means described with reference to Fig. 1 or by means described hereinafter with reference to Fig. 2.

In order to effect in the simplest manner the automatic control of the various members to be driven during operation of the apparatus relative to a turntable the vacuum bell may, according to the invention, be so controlled as to be vertically displaced but not rotated, and the guide rod may be so arranged as to be rotated but not axially displaced, the support being arranged for vertical displacement only.

When the apparatus is automatically operated provision should preferably be made for securing the cover in the simplest manner in the apparatus, and according to the invention, this is achieved by providing the lower end of the guide rod with means for securing the cover by vacuum.

A preferable embodiment of the apparatus according to the invention is characterized in that the means for securing the cover comprise a circular ring of a resilient material, said ring being so arranged as to rest against the upper side of the cover, the interior of the ring being connected to a vacuum source through a vacuum boring in the guide rod chuck.

In order to further control the securing of the cover automatically by means of vacuum the apparatus may, according to the invention, be so designed that through a counter valve the said vacuum boring is led to the outer side of the guide rod and that the vacuum container is provided with a vacuum compartment which is so arranged that vacuum is provided in said vacuum boring between cover and cover retainer cup when the vacuum bell is in its upper position.

To further ensure that the cover is automatically released when the closing is effected it is preferable, according to the invention, that at its lower edge the vacuum bell is provided with an inwardly extending flange 42 which may act as an abutment against the lower side of the cover retainer 16 which is slidably mounted on the guide rod, a vent leading from said vacuum boring to the outer side of the guide rod at a point thereof which is covered by the cover retainer when the latter has not yet been raised above its inoperative position by said abutment.

The embodiment of the invention shown in Fig. 2 is designed for automatic operation, for instance, in a turntable machine which may comprise a number of such apparatuses that are rotated about a common axis so that the various members of the apparatus may be operated during this movement. Each individual apparatus substantially differs from that shown in Fig. 1 by the fact that the vacuum bell 2 is so disposed as to be displaced only but not rotated relatively to the support 4, while on the other hand the guide rod 1 is mounted so as to be rotated relatively to the support 4 but cannot be vertically displaced. In addition to the vacuum boring 15 the guide rod 1 has a further vacuum boring 34 the upper end of which is connected through a ball valve 35 to outlets 36 which are in the outer side of the guide rod 1. At its lower end the boring 34 is ending within a resilient ring 37 against which the cover 32 may be held by vacuum when the outlets 36 are inside the vacuum compartment 10 so that vacuum is provided therein through the boring 34. The vacuum boring 15 is led outside the ring 37.

As with the embodiment shown in Fig. 1 the support 4 is mounted on the upper end of a shaft 18 slidably disposed in a bearing 38, and the lower end of the shaft 18 rests against a guide rail 39 having a projection 40 which has for its purpose to bring about the raising of the support by which the vacuum in the vacuum container is released as described above in connection with the embodiment shown in Fig. 1. To the upper end of the rod 1 a control arm 41 is secured by means of which the guide rod may be rotated. During this rotation the cover retainer 16 is carried along rotating the cover relatively to the container 33 so that the cover is screwed onto the container. At its lower end the vacuum bell has an inwardly extending flange 42 which, when the vacuum bell is raised, may abut against the cover retainer 16 thereby raising the latter through a short distance to release a vent 43 so that air may enter the compartment above the cover 32 thereby releasing the latter and the container 33. The compartment may be vented through vent 43 into the lower bell-portion. When the vacuum bell is raised through a further short distance the outlets 36 will again be within the vacuum compartment 10, and the apparatus will again be ready to receive the next cover and retain the same, while a new container is placed in the apparatus, and the appliance of the cover then takes place in quite a similar manner as that described above, except that as mentioned above the guide rod 1 will be rotated, while the vacuum bell 2 is only vertically displaced. Securing of the cover by vacuum is only utilized when the cover is positioned above the container, while securing of the cover during its appliance is effected in the same manner as described in connection with Fig. 1. Rotation of the guide rod 1 may, for instance, be effected by means of guide rails moving the arm 41, but since means of this type are well known from many turn-table machines and do not form any part of the invention, said means shall not be further described. The fork 6 is rotatably mounted directly on the vacuum bell 2, and the movements of said fork may also be controlled by cams or in any other suitable manner. While the evacuation means are shown to connect through conduit 13, the neck of the bell-housing 2 and through channel 15 of the stem of the guide-rod to the bell 2a, it is obvious to those skilled in the art, that an equivalent alternative would be to incorporate the vacuum and vent conduits to the outside of the bell 2a, or through the support 4 and that in such an instance, as an additional alternative the shaft 18 of the support 4 could be used for suction and vent conduits by means similar to those employed on guide-rod 1.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

I claim:

1. An apparatus for providing a container with a cover at sub-atmospheric pressure, comprising an apparatus frame, a guide rod, suction means, a container closing section, and a container support, said closing section comprising a vacuum bell-housing, said bell-housing mounted axially centered on said guide rod and adjacent to said container-support, means for reciprocal motion between said bell-housing and said support, means for an airtight closure between said bell-housing and said support on contact, clamping means to hold container during closing operation, a cover retainer centered axially on said guide rod, conduit means connecting said bell-housing with said suction means and with atmospheric pressure, means to control the sequences thereof, and means to attach a said cover to a said container under vacuum, wherein said guide rod is mounted to said frame suspended vertically and comprises a stem and a chuck at its lower end, wherein said bell-housing comprises an upper neck-portion and a bell below it, said neck portion comprising a vacuum compartment, connected to said suction line and an atmospheric vent compartment, spaced beneath it, said bell-housing mounted on said guide rod for reciprocating motion relative to it and relative to said support; bell-housing conduit means including at least one boring within said guide rod having at least one bell orifice in the said chuck and at least one bell orifice in said stem at a point near the dividing line between said vacuum compartment and said vent compartment, said compartments spaced to alternately engage the said bell-orifice in said stem at each stroke of said reciprocal movement of said bell-housing relative to said guide-rod, wherein said cover-retainer is of a cup shape, with a centered orifice and an inner recess mating with said chuck and the neck portion of said container, said cover retainer mounted on said guide rod over said chuck axially centered, and slidably mating with its outer wall the inner wall of said bell, wherein said cover-retainer comprises a resilient ring of a diameter equal to that of the outer flange of said cover, means to position said ring to rest against the upper side of the container and means to fasten the cover mounted in said ring to said container.

2. An apparatus for providing a container with a cover at subatmospheric pressure, comprising an apparatus frame, a guide rod, suction means, a container closing section, and a container support, said closing section comprising a vacuum bell-housing, said bell-housing mounted axially centered on said guide rod and adjacent to said container-support, means for reciprocal motion between said bell-housing and said support, means for an airtight closure between said bell-housing and said support on contact, clamping means to hold container during closing operation, a cover retainer centered axially on said guide rod, conduit means connecting said bell-housing with said suction means and with atmospheric pressure, means to control the sequences thereof, and means to attach a said cover to a said container under vacuum, wherein said guide rod is mounted to said frame suspended vertically and comprises a stem and a chuck at its lower end, wherein said bell-housing comprises an upper neck-portion and a bell below it, said neck portion comprising a vacuum compartment, connected to said suction line and an atmospheric vent compartment, spaced beneath it, said bell-housing mounted on said guide rod for reciprocating motion relative to it and relative to said support; bell-housing conduit means including at least one boring within said guide rod having at least one bell orifice in the said chuck and at least one bell orifice in said stem at a point near the dividing line between said vacuum compartment and said vent compartment, said compartments spaced to alternately engage the said bell-orifice in said stem at each stroke of said reciprocal movement of said bell-housing relative to said guide-rod, wherein said cover-retainer is of a cup shape, with a centered orifice and an inner recess mating with said chuck and the neck portion of said container, said cover retainer mounted on said guide rod over said chuck axially centered, and slidably mating with its outer wall the inner wall of said bell, a resilient chuck-ring axially mounted to the bottom of said chuck to suspend said cover by suction prior to applying it on said container, cover holding conduit means in said guide-rod, including a boring in said guide rod with cover-holding orifices in said stem and in said chuck, said orifice in said chuck centered over the interior of said chuck-ring and suction means controllably connected to said cover-holding conduit means.

3. An apparatus for providing a container with a cover at subatmospheric pressure, comprising an apparatus frame, a guide rod, suction means, a container closing section, and a container support, said closing section comprising a vacuum bell-housing, said bell-housing mounted axially centered on said guide rod and adjacent to said container-support, means for reciprocal motion between said bell-housing and said support, means for an airtight closure between said bell-housing and said support on contact, clamping means to hold container during closing operation, a cover retainer centered axially on said guide rod, conduit means connecting said bell-housing with said suction means and with atmospheric pressure, means to control the sequences thereof, and means to attach a said cover to a said container under vacuum, wherein said guide rod is mounted to said frame suspended vertically and comprises a stem and a chuck at its lower end, wherein said bell-housing comprises an upper neck-portion and a bell below it, said neck portion comprising a vacuum compartment, connected to said suction line and an atmospheric vent compartment, spaced beneath it, said bell-housing mounted on said guide rod for reciprocating motion relative to it and relative to said support; bell-housing conduit means including at least one boring within said guide rod having at least one bell orifice in the said chuck and at least one bell orifice in said stem at a point near the dividing line between said vacuum compartment and said vent compartment, said compartments spaced to alternately engage the said bell-orifice in said stem at each stroke of said reciprocal movement of said bell-housing relative to said guide rod, wherein said cover-retainer is of a cup shape, with a centered orifice and an inner recess mating with said chuck and the neck portion of said container, said cover retainer mounted on said guide rod over said chuck axially centered, and slidably mating with its outer wall the inner wall of said bell, wherein said bell orifice and said cover-holding orifice in said stem, and the said vacuum compartment with suction means and the said vent compartment in said neck of said bell-housing, are spaced and positioned relative to each other distances and points selected to control the sequences of suctions and releases of the said cover holding, cover applying, container evacuating and container grasping mechanisms.

4. An apparatus for providing a container with a cover at subatmospheric pressure, comprising an apparatus frame, a guide rod, suction means, a container closing section, and a container support, said closing section comprising a vacuum bell-housing, said bell-housing mounted axially centered on said guide rod and adjacent to said container-support, means for reciprocal motion between said bell-housing and said support, means for an airtight closure between said bell-housing and said support on contact, clamping means to hold container during closing operation, a cover retainer centered axially on said guide rod, conduit means connecting said bell-housing with said suction means and with atmospheric pressure, means to control the sequences thereof, and means to attach a said cover to a said container under vacuum, wherein said guide rod is mounted to said frame suspended vertically and comprises a stem and a chuck at its lower end, wherein said bell-housing comprises an upper neck-portion and a bell below it, said neck portion comprising a vacuum compartment, connected to said suction line and an atmospheric vent compartment, spaced beneath it, said bell-housing mounted on said guide rod for reciprocating motion relative to it and relative to said support; bell-housing conduit means including at least one boring within said guide rod having at least one bell orifice in the said chuck and at least one bell orifice in said stem at a point near the dividing line between said vacuum compartment and said vent compartment, said compartments spaced to alternately engage the said bell-orifice in said stem at each stroke of said reciprocal movement of said bell-housing relative to said guide-rod, wherein siad cover-retainer is of a cup shape, with a centered orifice and an inner recess mating with said chuck and the neck portion of said container, said cover retainer mounted on said guide rod over said chuck axially centered, and slidably mating with its outer wall the inner wall of said bell, and a counter valve mounted in said cover holding conduit below said cover holding orifice in said stem.

5. A vacuum sealing apparatus for applying a screw threaded or bayonet cover to a container comprising a vacuum bell-housing and a container support, said support movable relatively to said housing, a lid retaining member within the upper part of said housing, means for airtight closure between said housing and said support on contact, means for applying vacuum to the interior of the bell housing, when said bell is in airtight contact with the support, means for applying a relative rotatable movement between the bell housing and the lid retaining member, means for clamping the container relatively to the bell, said clamping means including two or more grippers, each mounted on a spring actuated piston disposed in a cylinder extending transversely through the wall of said bell, the interior of said cylinder being connected with the free air at the face of the piston away from the interior of the bell housing.

6. A vacuum sealing apparatus as claimed in claim 5, wherein said lid retaining member comprises a resilient ring of a diameter slightly less than the diameter of the outer flange of said lid.

7. A vacuum sealing apparatus for applying a screw threaded or bayonet cover to a container comprising a vacuum bell housing and a container support, said support movable relatively to said housing, a lid retaining member within the upper part of said housing, means for airtight closure between said housing and said support on contact, means for applying vacuum to the interior of the bell housing, when said bell is in airtight contact with the support, means for applying a relative rotatable movement between the bell housing and the lid retaining member, means for clamping the container relatively to the bell, said clamping means including two or more grippers, each mounted on a spring actuated piston disposed in a cylinder extending transversely through the wall of said bell, the interior of said cylinder being connected with the free air at the face of the piston away from the interior of the bell housing, and wherein said lid retaining member comprises a resilient chuck-ring axially mounted to the bottom of said chuck to suspend said cover by suction prior to applying it on said container, cover holding conduit means in said guide-rod, including a boring in said guide rod with cover-holding orifices in said stem and in said chuck, said orifice in said chuck centered over the interior of said chuck-ring and suction means controllably connected to said cover-holding conduit means.

8. A vacuum sealing apparatus as claimed in claim 7, wherein said bell orifice and said cover-holding orifice in said stem, and the said vacuum compartment with suction means and the said vent compartment in said neck of said bell-housing, are spaced and positioned relative to each other distances and points selected to control the sequences of suctions and releases of said cover holding, cover applying, container evacuating and container grasping mechanisms.

9. A vacuum sealing apparatus as claimed in claim 7, comprising a counter valve mounted in said cover holding conduit below said cover holding orifice in said stem.

References Cited in the file of this patent
UNITED STATES PATENTS

| | | |
|---|---|---|
| 1,279,413 | Norton | Sept. 17, 1918 |
| 2,033,951 | Nordquist | Mar. 17, 1936 |